US006088705A

United States Patent [19]

Lightstone et al.

[11] Patent Number: 6,088,705

[45] Date of Patent: Jul. 11, 2000

[54] METHOD AND APPARATUS FOR LOADING DATA INTO A DATABASE IN A MULTIPROCESSOR ENVIRONMENT

[75] Inventors: Sam S. Lightstone, North York, Canada; Alain C. Comeau, Woodinville, Wash.

[73] Assignee: International Business Machines Corporation, Armonk, N.Y.

[21] Appl. No.: 09/093,188

[22] Filed: Jun. 8, 1998

[30] Foreign Application Priority Data

Jul. 2, 1997 [CA] Canada .................................. 2209549

[51] Int. Cl.[7] ...................................................... G06F 17/30

[52] U.S. Cl. ................................ 707/200; 707/7; 707/10; 709/106; 709/202; 714/11

[58] Field of Search ................................. 707/7, 104, 10, 707/1, 2, 3, 200–203; 709/202, 104, 106; 714/10–12

[56] References Cited

U.S. PATENT DOCUMENTS

| | | | |
|---|---|---|---|
| 5,117,495 | 5/1992 | Liu | 707/1 |
| 5,261,065 | 11/1993 | Urabe et al. | 707/1 |
| 5,566,349 | 10/1996 | Trout | 714/1 |
| 5,640,554 | 6/1997 | Take | 707/7 |
| 5,666,525 | 9/1997 | Ross | 707/2 |
| 5,802,357 | 9/1998 | Li et al. | 707/2 |
| 5,822,749 | 10/1998 | Agarwal | 707/2 |
| 5,893,097 | 4/1999 | Hayata et al. | 707/10 |

OTHER PUBLICATIONS

"Personal Supercomputing: Virtual Memory, 64–bit," Hirschsohn, Ian, Dr. Dobb's Journal. v17, n8, p. 50(7), Aug. 1992, available on–line Dialog file 275.

*Primary Examiner*—Hosain T. Alam
*Attorney, Agent, or Firm*—Ohlandt, Greeley, Ruggiero & Perle, L.L.P.

[57] ABSTRACT

This invention provides a method and apparatus for loading data having a predetermined order of data records from a source into a database using parallel processing. Using one or more reading agents, data records are read from the source in which they are stored. These data records are stored in groups of records. Each group of stored records are tagged with a sequence identifier corresponding to the predetermined order of data. Apparatus is provided for formatting the data records in the groups using a plurality of formatting agents in parallel. The formatted records are stored in formatted record groups. Sequence identifiers are written for each of the groups to the respective formatted record group. A record identification apparatus is provided for assigning page locations for the records using the sequence identifiers to maintain the predetermined order.

13 Claims, 3 Drawing Sheets

METHOD AND APPARATUS FOR LOADING DATA INTO A DATABASE IN A MULTIPROCESSOR ENVIRONMENT

FIELD OF THE INVENTION

This invention relates to the loading of data into a database operating in a data processing system comprising a network of multiple Central Processing Units (CPUs), typically known as Symmetric Multi processors (SMPs).

BACKGROUND OF THE INVENTION

With the advent of databases it is incumbent on the user or operator of a database to INSERT user supplied data into the database in a form that is consistent with the internal storage form of data for the database. A Database Management System (DBMS) or LOAD utility is used to convert the user supplied data into the internal database form. The actions of parsing, conversion, and formatting data into this internal form is a CPU intensive operation. LOAD utilities reading from user supplied source media, such as disks, or tapes containing user supplied data incur the overhead of these conversions, as do INSERTs issued to the DBMS. Because of these CPU intensive operations, insertion of user data may become a CPU bound activity.

It is well known in the art that database records are grouped into pages of predetermined size. A number of pages are grouped together into a table, and each page in the table contains a number that denotes its sequence in the table. Pages of a table are typically written to persistent storage (such as disk).

Symmetric Multi processors (SMPs) comprise a class of computers containing multiple CPUs. Operating systems running on SMPs dispatch processes and threads to different CPUs in order to distribute the workload assigned across the available processors. For a given program to exploit the power of an SMP, it is advantageous that it is designed so that it performs portions of its workload in separate dispatchable units of work which the operating system of the SMP can distribute to the various CPUs in the SMP.

It would be a definite advantage in many cases that when data is loaded into the database of an SMP system, the ability to perform parsing, conversion and formatting processes in concurrent dispatchable operating system units in order to exploit the advantages of the SMP system hardware and operating system.

The difficulty is that the design of a method and apparatus in order to load data for processing in concurrent dispatchable operating system units is nontrivial because of the numerous items of state information which must be maintained as part of the database table meta-data (stored data that describes the database table concerned), such as free space control records, a table descriptor record, etc. as will be appreciated by those skilled in the database art. Despite the complexity of the problem, solutions to it have been attempted in the past.

However, in the normal case, adding true parallel processing (i.e.. True decoupled concurrent processing) the data is processed by each CPU in the system independently, resulting in the data being loaded into the database table in an arbitrary sequence. This means that the data is stored in an arbitrary sequence in the table, and as well, in an arbitrary physical sequence on the database storage device used by the data processing system.

As will be appreciated by those skilled in the art reviewing this application, the arbitrary sequence of data both logically in the database table and physically on the storage device being used by the data processing system to store database information can pose a problem if the source data was intentionally supplied by the user in a significant order (such as cluster order). It can also result in poor exploitation of the buffer pool and I/O prefetchers used by the data processing system to accelerate or optimize data retrieval. The net result of which is ultimately that corruption of the sequence of the records in the source data may negatively impact subsequent query performance. As will be appreciated, query performance is one of the primary judgement criteria for which database products compete.

The very requirement for data order and the advantages of parallel processing appear to be opposed to each other. In order to take advantage of parallel processing it appears that the prior art would require sacrifice of the required data order, while corrupting the data order appears to negatively impact processing performance including query performance.

The performance results are major indicators of product performance, and are heavily used by customers in deciding which Database products to buy.

The Transaction Processing Performance Council (TPC) regularly establishes guidelines for transaction processing and database benchmarks against which Database vendors regularly compete. Database vendors regularly publish their TPC compliant performance results. The official TPC benchmarks include both query performance, as well as the database creation time (of which LOADing data is a major component). So, both the creation of the database and the subsequent query performance are major factors which customers consider, and for which Database product producers aim.

The term transaction is often applied to a wide variety of business and computer functions. From the point of view of a computer function, a transaction could refer to a set of operations including disk read/writes, operating system calls, or a type of data transfer from one system or subsystem to another.

While TPC benchmarks involve the measurement and evaluation of computer functions and operations, the TPC regards a transaction as it is commonly understood in the business world: a commercial exchange of goods, services, or money. A typical transaction, as defined by the TPC, would include the updating to a database system for such things as inventory control (goods), airline reservations (services), or banking (money).

SUMMARY OF THE INVENTION

The current invention relates to methods and apparatus for data loading into a database table which exploits true SMP parallelism. The preferred embodiment disclosed below has been laboratory tested and shown to yield excellent parallel processing, scalability permitting good performance on SMP systems to at least 12 parallel CPUs, and which preserves the user provided order of the table data during the loading process.

In one aspect of the invention which is designed for use in a MULTI PROCESSOR data processing system capable of parallel processing, a method is provided for loading data having a predetermined order of data records into a database using parallel processing, using one or more reading tasks, reading each data record from the location in which it is stored; storing each said record in a buffer memory block of predetermined size;

tagging each buffer with a sequence identifier; transferring control of each said buffer to the control of one of a plurality of formatting tasks;

converting said records of data into a suitable database storage format;

storing said formatted data records in buffers;

writing said sequence identifier to said buffers of formatted data;

assigning a database page location for each record using said formatted data buffer order and said sequence identifier to maintain said predetermined order;

assembling said records into pages;

writing said pages to storage at the locations specified.

In another aspect of the invention a record is read from data records having a pre selected order from a source location of the data. Each record is stored in buffer blocks of pre selected size, and each buffer block is tagged with a sequence number corresponding to said pre selected order of said record in its source location. Control of the buffers is transferred to a plurality of formatter tasks or agents for processing in parallel. The records of data are converted to a suitable database storage format, and stored in buffers. A sequence identification number of each buffer is written to the buffers of formatted record data. Control of the buffers of formatted data is transferred to a RiDer agent. For the data records of each buffer a database page location is assigned maintaining the pre selected order by means of the formatted data record buffer order and sequence identification number. Control of the formatted data is transferred to a plurality of writer agents. The formatted records are assembled into pages which are written to system storage in the assigned storage locations.

In still another aspect of the invention apparatus is provided for loading data records having a pre selected order using a parallel data processing system to load the data into the data storage of a database while maintaining the pre selected data order. The apparatus includes at least one reader agent to read the data, preferably a number of formatter agents for converting the data records read by the reader agent to a format suitable for the database. Apparatus is provided for storing the formatted records in a buffer, and assigning with sequence number to the buffer of the data records. A Record Identification (RIDer) agent is provided for assigning data processing system storage location for each read data record. Apparatus is provided for assembling the formatted records into pages, and a number of writer agents are provided for writing each page to the appropriate assigned storage location.

Yet another aspect of the invention provides a method of loading data having a predetermined order of data records from a source into a database using parallel processing comprising:

using one or more reading agents, reading data records from the source in which they are stored;

storing said records in groups of records;

tagging each group with a sequence identifier corresponding to said predetermined order of data;

formatting the data records in said groups using a plurality of formatting agents in parallel;

storing said formatted records in formatted record groups;

writing said sequence identifier of each said group to the respective formatted record group;

assigning page locations for said records using said sequence identifiers to maintain said predetermined order.

Still another aspect of the invention provides a computer program product comprising:

a computer usable medium having computer readable program code means embodied therein for causing a computer to load user data, the computer program product comprising:

computer readable program code means for causing a computer to effect apparatus for loading data records having a pre selected order using a parallel data processing system to load said data into the data storage of a database using said data processing system while maintaining said pre selected data order, comprising;

computer readable program code means for causing a computer to effect at least one reader agent to read said data;

computer readable program code means for causing a computer to effect buffer storage means for storing said data in buffers;

computer readable program code means for causing a computer to effect tagging means for tagging each buffer containing said data with a sequence number corresponding to the pre selected order of the data;

computer readable program code means for causing a computer to effect a plurality of formatter agents for converting said data records read by said at least one reader agent to a format suitable for said database;

computer readable program code means for causing a computer to effect means for storing said formatted records in formatted record buffers, with the sequence numbers of the buffers containing said data;

computer readable program code means for causing a computer to effect a (RIDer) agent for assigning page locations for each said formatted data records;

computer readable program code means for causing a computer to effect means for assembling said formatted records into pages, and;

computer readable program code means for causing a computer to effect a plurality of writer agents for writing each said pages to said assigned storage locations.

Another aspect of this invention provides a program storage device readable by a machine, tangibly embodying a program of instructions executable by the machine to perform method steps for loading data having a predetermined order of data records from a source into a database using parallel processing said method steps comprising:

using one or more reading agents, reading data records from the source in which they are stored;

storing said records in groups of records;

tagging each group with a sequence identifier corresponding to said predetermined order of data;

formatting the data records in said groups using a plurality of formatting agents in parallel;

storing said formatted records in formatted record groups;

writing said sequence identifier of each said group to the respective formatted record group;

assigning page locations for said records using said sequence identifiers to maintain said predetermined order.

DESCRIPTION OF THE PREFERRED EMBODIMENTS OF THE INVENTION

Figure 2:
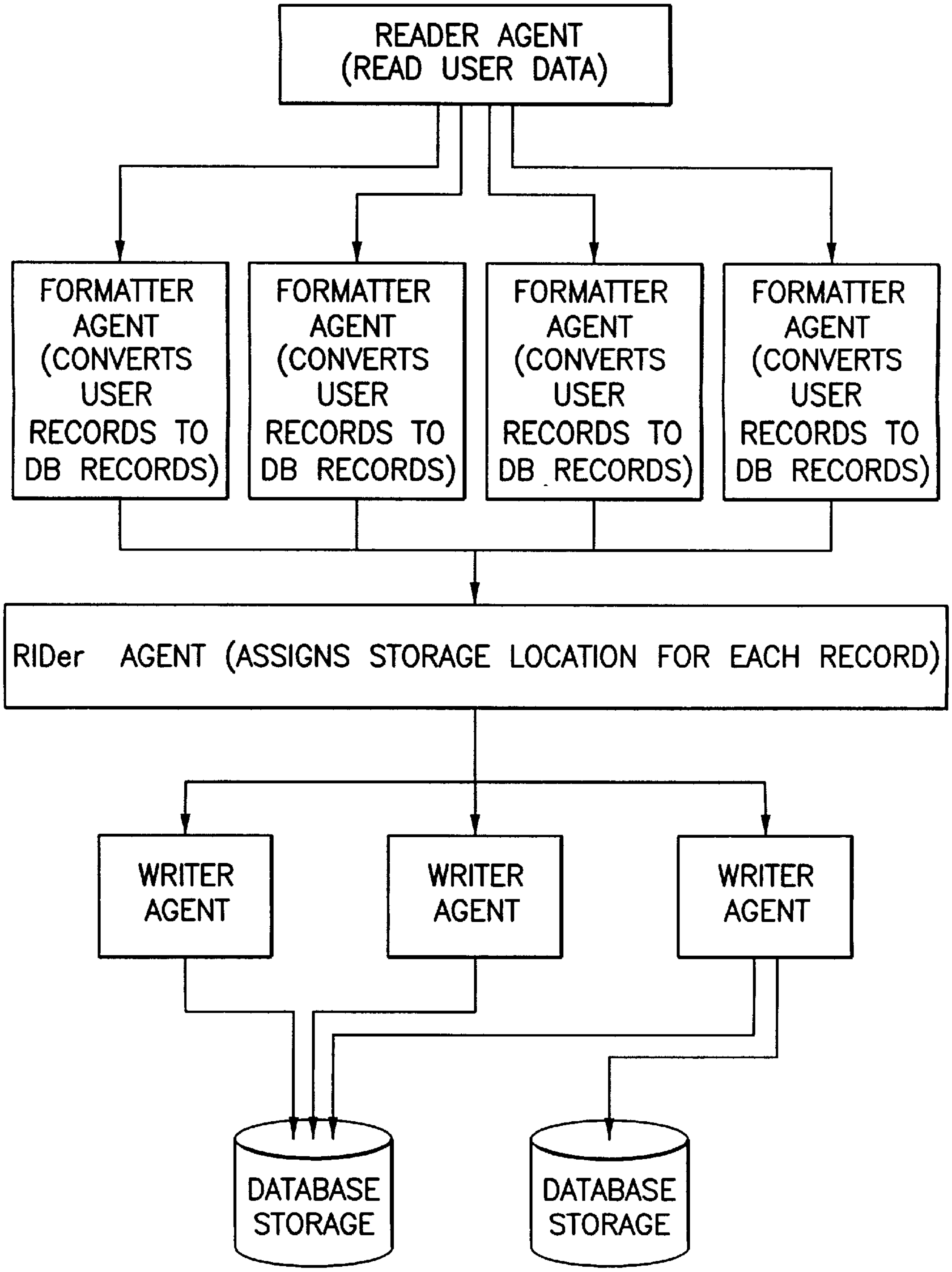
FIG. 2 is a block diagram of a process model for a preferred embodiment of the invention.

Referring to FIG. 2 which illustrates a process model for a preferred specific embodiment of the invention it can be seen that a single Reader Agent 1 is provided to read user data records. This information is transferred to the control of a number of Formatter Agents 2 which convert the user data records to records in a suitable database format corresponding to that used by the database of the data processing system for which the invention can be used. The Record Identification (RIDer) Agent 3 assigns each record a location within a page of the database table.

The Writer Agents 4 construct pages (i.e. assemble formatted records into pages) based on the location assigned to each record by the RiDer agent, in conjunction with the formatted record data. The Writer Agents write fully constructed pages to persistent storage (e.g. disk). It should be noted that page construction could be done by other agents.

The agents shown in FIG. 2 combine to form a data LOADer, i.e. a collection of software agents that together load user data into a database table.

Figure 1A:
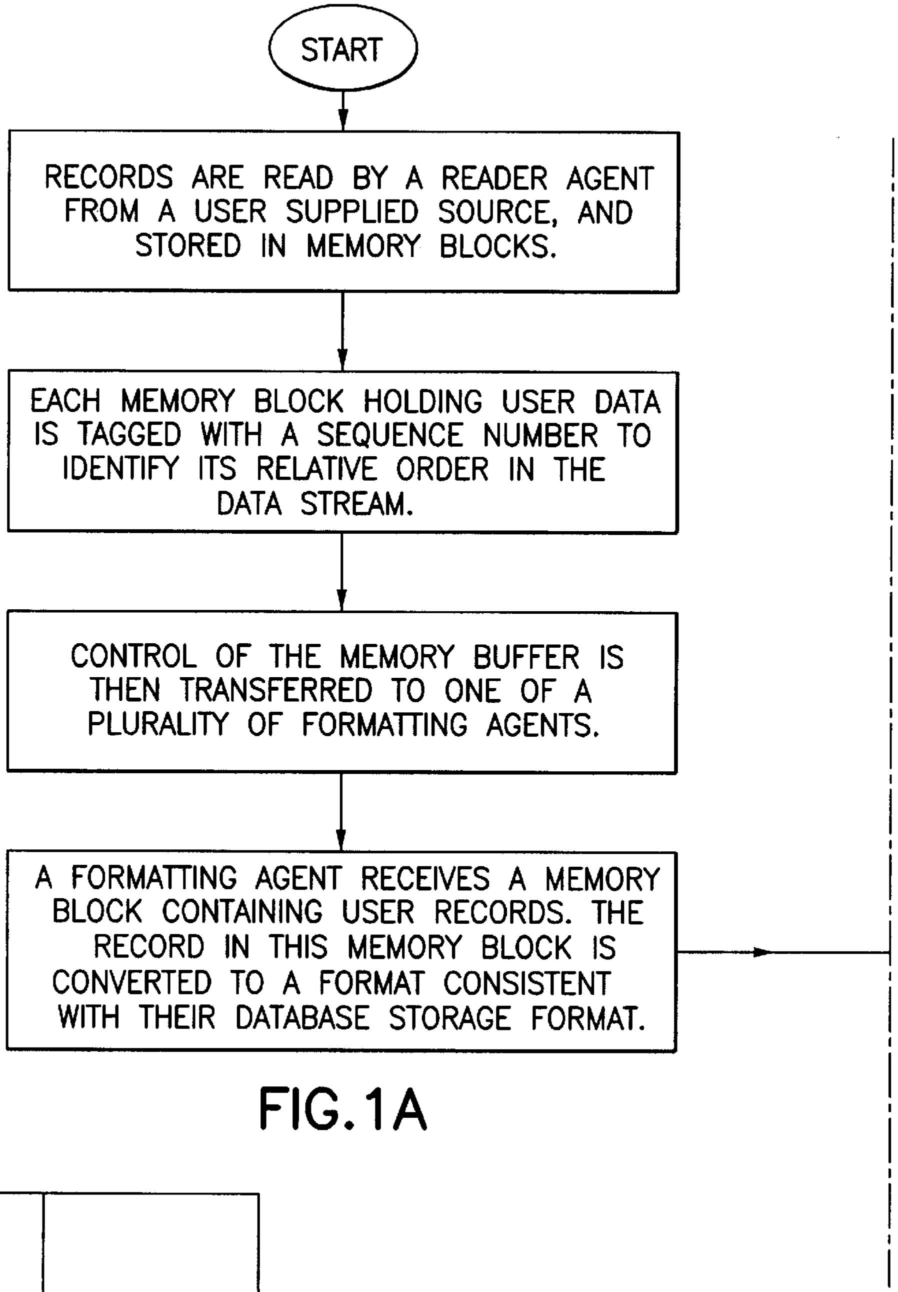
FIG. 1 is a flow diagram of a preferred method of the invention.
Figure 1:
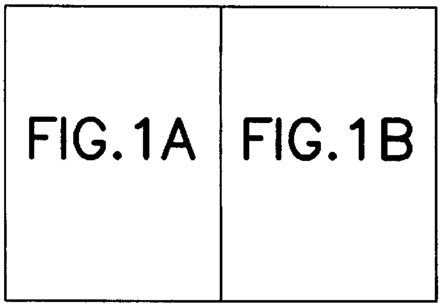
Figure 1B:
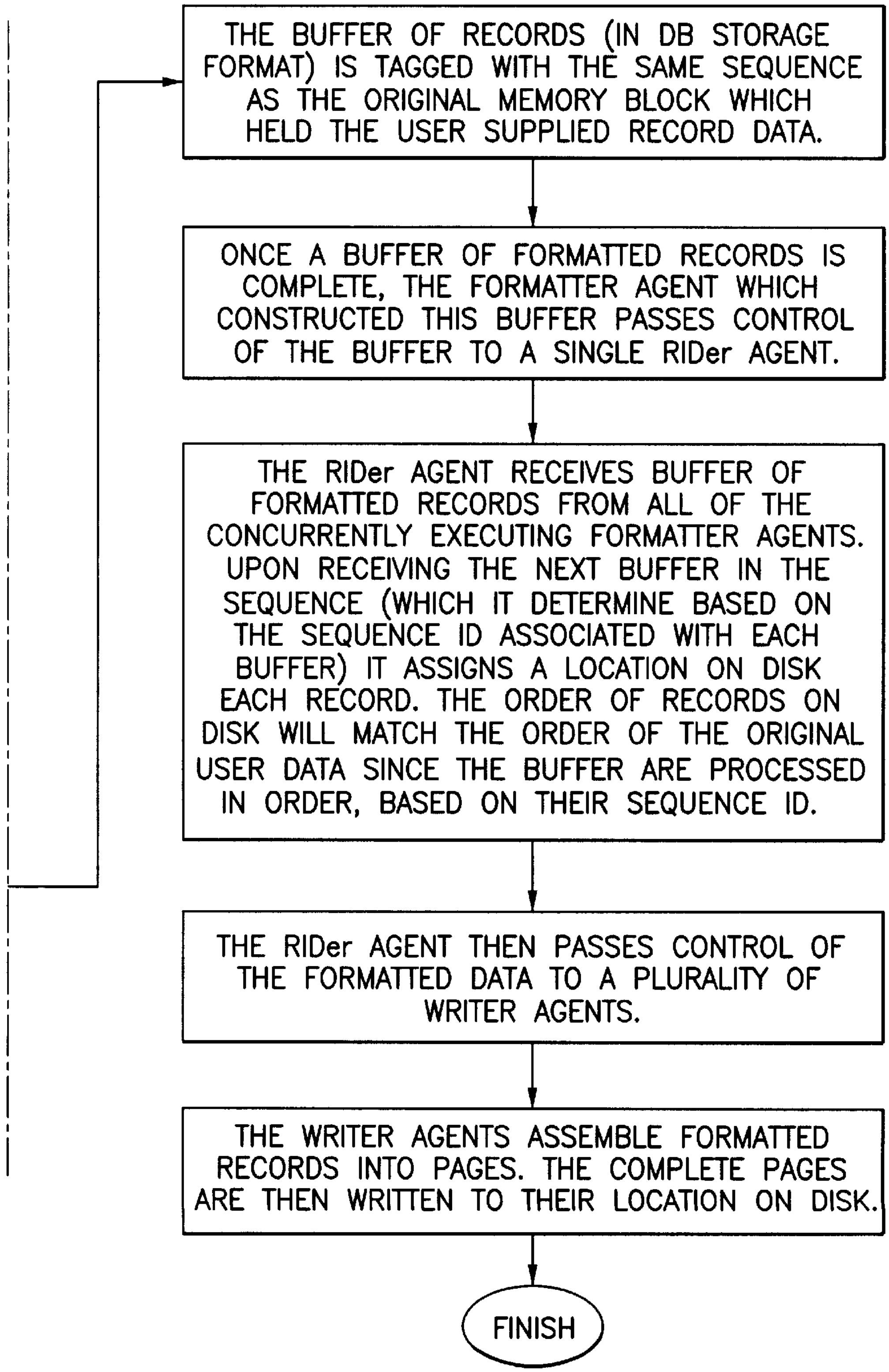

FIG. 1, which represents a flow chart for the load SMP exploitation with record sequence preservation system of the present invention is described below:

A data processing system user having sequential data records to be entered into a database on an SMP system would initiate loading of the data by the data processing system.

In order that the data records can be quickly processed using the capabilities of the SMP system parallel processing the invention provides the following process which may be conveniently implemented using software agents or tasks running on the data processing system.

At the start of record entry the user supplied records are read by a reader agent from the source supplied by the user, e.g. diskette or tape, and stored in memory block buffers in the memory area of said data processing system.

In order to assist in record order preservation during the currency of the operation each memory block buffer holding user data is tagged with a sequence number to identify its relative order in the data stream resulting from the data loading process.

Once this tagging has been accomplished in a buffer, control of that memory buffer is then transferred to one of a number of formatting agents. The Formatter agent reads the user data records from the buffer received from the Reader, converts each record into internal database storage format, and stores the converted records in a second memory block or buffer in the same order that these records appeared in the memory buffer containing the user data (received from the Reader agent). The buffer containing the records, now in the database storage format is tagged with the same sequence as the original memory buffer which held the user supplied record data. The operation of the formatter agents is carried on concurrently taking advantage of the parallel processing capabilities of the SMP system on which they are operating.

Once the formatted record data in a buffer is complete the formatter agent which constructed the formatted data records passes control of the buffer to a single RiDer agent.

The RIDer agent (The name RiDer was chosen as the RIDer agent assigns a Record Identifier (RID) to each record. The RID represents the location of a record on a page (including identification of the page)) receives control of buffers of formatted records from all of the concurrently executing formatter agents (i.e. parallely executing formatter agents). Upon receiving the next buffer in the sequence (which it determines based on the sequence ID associated with each buffer of formatted records) it assigns a location on a page in the database table to each record.

The RiDer agent uses the sequence number on each formatted record buffer to ensure that it processes them in the originating sequence (that is, the sequence of the user data)

Once its work is done the RiDer agent then passes control of the formatted data to a number of writer agents implemented by the invention and operating on the data processing system for parallel or concurrent application. The writer agents then assemble the formatted records into pages, i.e. the Writer agents construct pages based on the location assigned to each record by the RIDer agent, in conjunction with the formatted record data. The fully constructed pages are then written to their location on the data processing system's database storage. This can be done by the Writer agents or some other agent.

As result of this, the order of records on the (e.g. disk) storage of the data proces sing system will match the order of the original user data since the lists are processed in order based on their sequence Ids.

Pseudo Code

The preferred embodiment above as illustrated in FIGS. 1 and 2 may be further understood by more particular information present in the following pseudo code which illustrates a software implementation of the invention which achieves load SMP exploitation with record sequence preservation when suitably formulated for use on a SMP data processing system.

Pseudo Code For Reader Agent

```
{
  Open user data source for reading;
  Read nK bytes of user data into the bottom half of a memory buffer
of 2nK bytes;
  Strip any existing partial record from the bottom of this nK bytes
of data just read;
  Store a copy of the partial record in a temporary storage area;
  If there was a partial record in the previous read operation,
then prefix that partial record to the start of the nK memory area;
  Tag the memory buffer with a sequence identifier;
  Transfer control of the memory buffer to one of the Formatter agents;
  Continue reading the next nK bytes of user data until all user data
is read;
}
```

Comments: There can be more than one Reader agent used, as long as a relationship is provided e.g. in the form of a software algorithm to correctly tag the user data records in the buffers with suitable sequence Ids. In the specific embodiment illustrated only a single Reader agent is illustrated so the assignment of sequence Ids is straightforward e.g. the first block of user data has sequence ID 0, the second block has ID 1, etc.

While the pseudo code of the Reader agent has been generalized for a buffer storage area of 2 nK bytes, the implementation tested as described below is a specific implementation for an arbitrary record length limit. Assuming that no user record could exceed 32 K, a 64 K buffer was allocated so that a whole number of records could be read into a block of memory. In the 64 K buffer 32 K of user data was read into the bottom half of the buffer. (While the 32 K size is up to the system designer the important consideration is that the bottom half of a buffer large enough to hold at least one record is used. The pseudo code reflects that the buffer is twice the size of the expected data block.) The data was examined by the Reader, to determine if a partial record existed at the end of the block. If a partial record existed (and it frequently did) the partial record was copied to a temporary storage space, and the end of the memory block was redefined to be the byte prior to the start of the partial record. When the next 32 K bytes of user data was read (again into the bottom half of the 64 K buffer ) the partial record from the end of the previous block was prefixed to this buffer. The pseudo code illustrated enables the particular embodiment described to handle complete records rather than partial records. This is a useful feature for the situation in which records have varying lengths.

Sequence Ids can be in any form sufficient to identify the order of the data, such as: alphabetic identifiers, integer identifiers, the modulo of the formatter count, etc.

In another implementation of the invention user data can be alternatively read by any of the other agents in the process model.

Pseudo Code for Formatter Agent

```
{
  Receive control of a memory buffer containing user record data
in user format;
  Convert the next user record into a formatted record consistent
with the form of records in database storage;
  The converted record, now in database form, is added to a buffer
of formatted records;
  If this is the last record in the buffer:
  {
    Tag the buffer containing formatted records with a sequence ID
  idendical to th e sequence ID of the user data area;
    Transfer control of the buffer containing database-formatted
  record to the RIDer agent;
    Obtain control of a new buffer of user data from the Reader agent;
  }
  else, there are more user records to process;
  {
    continue formatting the next user record;
  }
}
```

Comments

There can be nay number of formatter agents, but the performance of this invention can be optimized by correlating (but not necessarily equating) the number of formatting agents with the number of system CPUs online.

Pseudo Code for Writer Agent

```
{
  Receive control of a buffer of formatted records, and their associated
location information from the RIDer agent;
  Construct database data pages;
  Write pages to storage devices;
  Obtain next buffer from RIDer agent, until complete;
}
```

Comments

There can be any number of Writer agents. Typically, the number of Writer agents should be related to the number of database storage devices used.

Database data pages could be written by agents other than the Writer agent, and could be constructed by agents other than the Write agent.

Pseudo Code for RIDer Agent

```
{
  Obtain a buffer of formatted database records from one of the
Formatter agents;
  if this buffer is the next expected buffer in the sequence of
buffers, based on the
      sequence ID:
  {
    For each record in the buffer of the formatted records, assign
a location within a page of the database table.
    After proessing the entire buffer, process any cached buffers of
formatted records that are in sequence;
```

-continued

```
    After all cached buffers of formatted records in perfect sequence
have been processed, return to the first step "Obtain a buffer of
formattd data records . . .";
  }
  else this buffer will need to be processed later:
  {
    Cache this buffer, until it can be processed in sequence;
  }
}
```

Comments

In the implementation illustrated "preserving record sequence" is an option on the loader. By specifying that the LOADer not exploit this capability, the RIDer is free to process data in any sequence, which can result in greater scalability on SMP systems.

Once written to disk the records can be conveniently and quickly accessed achieving a high degree of read efficiency.

Normally, to preserve the data sequence, the RIDer has to wait until it gets the next buffer of formatted data in the sequence. For example, while waiting for formatted data buffer #6, it may receive formatted data buffers #8 and #9, then #7. It waits until #6 arrives. Once #6 arrives from the formatter that generated it the RIDer can then process buffers #6,#7,#8, and #9 even though they arrived in order 8,9,7,6.

But, if preserving order is not important, the RlDer can just process the buffers of formatted data as they arrive, regardless of their sequence ID's. (i.e. in this example the RIDer would process buffers in the order #8, #9, #7, and then #6 ) So the RIDer doesn't need to wait for the correct buffer to show up, and wastes less time waiting.

This variation of the invention takes advantage of the parallel processing capabilities of the LOADER of the invention providing significant speed advantages but does not preserve the entire original record sequence.

EXAMPLE

The following example should assist in clarifying one embodiment of the invention. In this embodiment user data is stored in a file on disk, for example, in a format compatible with the LOAD utility of the database management system in use on the data processing system in use.

Shown in this example is a 3 column table stored in delimited ASCII. The 3 columns are integer, 18 byte character, and floating point, respectively. Note that a new line character, 0x0A, is implied at the end of each line. Columns are delimited by the "," character:

5, My dog, 23.4

7, Your dog, 69.7

12, Bob's dog, 30.0

14, Sue's dog, 10.4

11, Ken's dog, 11.2

9, John's dog, 26.1

The user data can be represented as follows in memory:

| The data, in HEX representation looks like: | The same data in buffered ASCII: |
|---|---|
| 352C4D79 20646F67 2C32332E 340A372C | 5,My dog,23.4,7, |
| 596F7572 20646F67 2C36392E 370A3132 | Your dog, 69.7,7,12 |
| 2C426F62 27732064 6F672C33 302E300A | ,Bob's dog,30.0, |

-continued

| The data, in HEX representation looks like: | The same data in buffered ASCII: |
|---|---|
| 31342C53 75652773 20646F67 2C31302E | 14,Sue's dog,10. |
| 340A3131 2C4B656E 27732064 6F672C31 | 4,11,Ken's dog,1 |
| 312E320A 392C4A6F 686E2773 20646F67 | 1,2,9,John's dog |
| 2C32362E 31 | ,26.1 |

The Reader agent stores data in a buffer, where a few bytes of storage are reserved for the sequence tag. For example, if the sequence tag was a 4 byte integer, and the memory set-aside for this tag was the first four bytes in the memory buffer, then the tagged memory (tagged with sequence 0x00000000), would have the following HEX representation:

```
                  00000000
352C4D79 20646F67 2C32332E 340A372C
596F7572 20646F67 2C36392E 370A3132
2C426F62 27732064 6F672C33 302E300A
31342C53 75652773 20646F67 2C31302E
340A3131 2C4B656E 27732064 6F672C31
312E320A 392C4A6F 686E2773 20646F67
2C32362E 310A0A
```

if the same data happened to appear in the second buffer of user data, it would be tagged with sequence ID 1 (instead of 0). In HEX form, this is 0x00000001. The memory buffer would then look like:

```
                  00000001
352C4D79 20646F67 2C32332E 340A372C
596F7572 20646F67 2C36392E 370A3132
2C426F62 27732064 6F672C33 302E300A
31342C53 75652773 20646F67 2C31302E
340A3131 2C4B656E 27732064 6F672C31
312E320A 392C4A6F 686E2773 20646F67
2C32362E 310A0A
```

When the formatter agent receives this buffer, it immediately can identify the sequence ID of the data, and thus it's relative position in the stream of data by reading, and storing this sequence ID.

The formatter converts each of the user records to a form consistent with the storage form of records in the DBMS. The formatted DBMS type records are stored in a buffer. The buffer is tagged with the same sequence ID as the buffer holding the corresponding user data.

For example: Consider a 64 K buffer holding a list of DBMS style records, where the first 4 bytes of the buffer was reserved for a sequence ID.

| 4 byte seq. ID |
|---|
| N1 bytes representing DBMS form of user record 1 |
| N2 bytes representing DBMS form of user record 2 |
| N3 bytes representing DBMS form of user record 3 |
| N4 bytes representing DBMS form of user record 4 |
| N5 bytes representing DBMS form of user record 5 |
| N6 bytes representing DBMS form of user record 6 |
| remaining unused bytes in 64K buffer. |

Note that the number of bytes required to represent the data record in DBMS (database management system) form may vary from record to record. N1, . . . N6 may or may not be the same.

The embodiments of the invention in which an exclusive property or privilege is claimed are defined as follows:

1. A method of loading data having a predetermined order of data records from a source into a database using parallel processing comprising:

using one or more reading agents, reading data records from the source in which said data records are stored;

storing said records in groups of records;

tagging each group with a sequence identifier corresponding to said predetermined order of data;

formatting the data records in said groups using a plurality of formatting agents in parallel;

storing said formatted records in formatted record groups;

writing said sequence identifier of each said group to the respective formatted record group;

assigning page locations for said records using said sequence identifiers to maintain said predetermined order.

2. The method of claim 1 including:

assembling said records into pages.

3. The method of claim 2 including:

writing said pages to storage at the locations specified.

4. The method of claim 1 in which said reader agents read nK bytes of user data into the bottom half of a memory buffer area of 2 nK bytes;

strips any existing partial record from the bottom of said nK bytes of data just read;

stores a copy of said partial record in a temporary storage area;

if a partial record of a previous read operation exists, then prefixes that partial record to the start of said nK memory area;

tags said memory storage area with a sequence identifier;

transfers control of said memory buffer to one of said formatter agents;

continues reading the next nK bytes of user data until all user data is read.

5. For a MULTI PROCESSOR data processing system capable of parallel processing, a method of loading data having a predetermined order of data records into a database using parallel processing comprising:

using one or more reading agents, reading data records from the source in which said data records are stored;

storing said records in memory buffers;

tagging each buffer with a sequence identifier corresponding to said predetermined order of data;

transferring control of each said buffer to the control of one of a plurality of formatting agents;

converting said records of data into a suitable database storage format;

storing said formatted records in formatted record buffers;

writing said sequence identifier of each said buffer to the respective said formatted record buffer;

forwarding said formatted record buffers to a record identifier agent;

assigning a page location for each record in said formatted record buffers using said sequence identifiers to maintain said predetermined order.

6. The method of claim 5 in which said formatted record buffers are processed by a record identifier agent as they are received.

7. The method of claim 6 in which said formatted record buffers are processed by a record identifier in the order of their sequence identifiers.

8. The method of claim 5 including assembling said records into pages and writing said pages to storage at the location specified.

9. For a parallel processing system, a method of loading data records having a pre selected order from a source location, in parallel, into a database, while maintaining said order, comprising:

reading a record from said source location;

storing said record in memory buffers of predetermined size;

tagging each buffer with a sequence number corresponding to said pre selected order of said record in its source location;

transferring control of said buffers to a plurality of formatter agents which operate in parallel;

converting each record to a suitable database storage format;

storing said formatted records in formatted record buffers;

writing a sequence identification number of each said buffer to said corresponding formatted record buffer;

transferring control of said formatted record buffers to a RIDer agent;

for each formatted record buffer being received in sequence assigning a page location to each record;

transferring control of said formatted data buffer to a plurality of writer agents;

assembling formatted records into pages writing said pages to said assigned storage locations.

10. The method of claim 9 for a parallel processing system, a method of loading data records having a pre selected order from a source location, in parallel, into a database, while maintaining said order, comprising:

reading a record from said source location;

storing said record in memory buffers of predetermined size;

tagging each buffer with a sequence number corresponding to said pre selected order of said record in its source location;

transferring control of said buffers to a plurality of formatter agents;

converting each record to a suitable database storage format;

storing said formatted records in formatted record buffers;

writing a sequence identification number of each said buffer to said corresponding formatted record buffer;

transferring control of said formatted record buffers to a RIDer agent;

for each formatted record buffer being received processing said formatted record buffers in order of their respective sequence identification numbers assigning page locations to said records maintaining said pre selected order by means of said sequence number order and sequence identification number;

transferring control of said formatted data buffer to a plurality of writer agents;

assembling formatted records into pages writing said pages to said assigned storage locations.

11. Apparatus for loading data records having a pre selected order using a parallel data processing system to load said data into the data storage of a database using said data processing system while maintaining said pre selected data order, comprising;

at least one reader agent to read said data;

buffer storage means for storing said data in buffers;

tagging means for tagging each buffer containing said data with a sequence number corresponding to the pre selected order of the data;

a plurality of formatter agents for converting said data records read by said at least one reader agent to a format suitable for said database;

means for storing said formatted records in formatted record buffers, with the sequence numbers of the buffers containing said data;

a RIDer agent for assigning page locations for each said formatted data records;

means for assembling said formatted records into pages;

a plurality of writer agents for writing each said pages to said assigned storage locations.

12. A computer program product comprising:

a computer usable medium having computer readable program code means embodied therein for causing a computer to load user data, the computer program product comprising:

computer readable program code means for causing a computer to effect apparatus for loading data records having a pre selected order using a parallel data processing system to load said data into the data storage of a database using said data processing system while maintaining said pre selected data order, comprising;

computer readable program code means for causing a computer to effect at least one reader agent to read said data;

computer readable program code means for causing a computer to effect buffer storage means for storing said data in buffers;

computer readable program code means for causing a computer to effect tagging means for tagging each buffer containing said data with a sequence number corresponding to the pre selected order of the data;

computer readable program code means for causing a computer to effect a plurality of formatter agents for converting said data records read by said at least one reader agent to a format suitable for said database;

computer readable program code means for causing a computer to effect means for storing said formatted records in formatted record buffers, with the sequence numbers of the buffers containing said data;

computer readable program code means for causing a computer to effect a (RIDer) agent for assigning page locations for each said formatted data records;

computer readable program code means for causing a computer to effect means for assembling said formatted records into pages, and;

computer readable program code means for causing a computer to effect a plurality of writer agents for writing each said pages to said assigned storage locations.

13. A program storage device readable by a machine, tangibly embodying a program of instructions executable by the machine to perform method steps for loading data having a predetermined order of data records from a source into a database using parallel processing said method steps comprising:

using one or more reading agents, reading data records from the source in which they are stored;

storing said records in groups of records;

tagging each group with a sequence identifier corresponding to said predetermined order of data;

formatting the data records in said groups using a plurality of formatting agents in parallel;

storing said formatted records in formatted record groups;

writing said sequence identifier of each said group to the respective formatted record group;

assigning page locations for said records using said sequence identifiers to maintain said predetermined order.

* * * * *